May 23, 1939.  R. C. ELLIOTT  2,159,475
TYPOGRAPHIC COMPOSING MACHINE
Filed Oct. 28, 1937   6 Sheets-Sheet 6

Patented May 23, 1939

2,159,475

UNITED STATES PATENT OFFICE 2,159,475

TYPOGRAPHIC COMPOSING MACHINE

Richard Cornelius Elliott, London, England, assignor to Lanston Monotype Machine Company, Philadelphia, Pa., a corporation of Virginia Application October 28, 1937, Serial No. 171,433
In Great Britain May 13, 1937

9 Claims. (Cl. 199—80)

This invention relates to typecasting and composing machines wherein, under the control of a record-strip, single type bodies are cast and composed in justified lines, which, as completed, are transferred to and arranged column-wise in a galley.

Various elements or mechanisms in such machines are under the control of the record-strip; for example, mechanism for positioning a die-case or matrix-carrier to centre the desired matrix on or over the mold; mechanism for dimensioning the mold for each character or like type, space or quad, and mechanism for effecting or ensuring the justification of each line.

Each character or like type, blank space or quad, and each justification space, is represented by a separate signal in the record-strip and such signals in general, comprise two components.

In typecasting and composing machines to which the present invention is applicable a line of types is cast in the order reverse to composition, so that the type body represented by the last signal in the record-strip is the first to be cast.

In the present commercial composing machines, when the textual matter does not extend to the full measure of a complete line, separate or individual signals or perforations have to be in the record-strip for each blank or space required to fill out or complete the line to the required measure. Each of such blank type bodies has to be recorded in the record-strip by a separate signal operation on the composing machine. This takes up a certain amount of time and occupies a considerable amount of space in the record-strip.

With the machines as hitherto contrived, when the textual matter does not extend to the full measure of the line to be cast and is to be in the centre of such line, the operator of the record-strip composing machine, must calculate the number units to be occupied by the text, deduct this from the total measure, and insert in the record-strip individual signals for half the number of blank types required in front of the text and a corresponding number of similar signals behind the text. Such an operation takes up time and requires care, in addition to requiring individually repeated signals in the record-strip.

Likewise, when a line of character-bearing type is short of the full measure, as for example at the end of a paragraph, it is necessary, in order to complete and justify such a line, to fill up the remaining or surplus space with blank types or quads. To accomplish this in known commercial machines, it is necessary for the operator of the record-strip composing machine, to tap a key or otherwise record a separate signal for each individual space or blank, which occupies time and a considerable amount of record-strip.

Also in certain cases it may be desirable to insert blank spaces in front of the textual matter in a line, and in this case likewise, in record-strip composing machines at present in use, a separate signal has to be recorded in the record strip for each blank type body to be cast.

The chief object of the present invention is to provide on casting and composing machines, controlled by a record-strip, mechanism whereby from a single signal in the record-strip, repeated casts can be made to produce the necessary or required number of quads, blank spaces or blank type bodies, both in front of, and behind, the character or similar type bodies in a line, or only in front of, or only in rear of such type-bodies. In all these cases, the line will be cast to the full or required measure without involving the necessity of calculations, as above referred to and with a considerable saving in the amount of record-strip required for a particular piece of composition.

According to the present invention, there is provided for the record-strip feeding mechanism of such casting and composing machines one or more locking devices operated or controlled from or by a signal or signals in the record-strip and one or more releasing device or devices operated to release the locking device or locking devices either after a predetermined number of casts had been made in accordance with a single type-signal in the record-strip, or when a cast and composed line of types, including record-strip controlled repeated casts, has reached a predetermined length or measure.

In accordance with this invention also the signal recorded in the record-strip to actuate or control the inauguration of the repeat casting mechanism also acts to dictate or determine the positioning of the die case or matrix carrier over the mold, thereby obviating the use of a separate signal to control or position the die case.

The record-strip controlled single-type casting and composing machine, with which the present invention will be particularly described and illustrated, is that set forth in the specification of United States Letters Patent No. 625,998, dated May 30, 1899, with an improved paper-feed mechanism as set forth in the specification of United States Letters Patent No. 674,362, dated May 21, 1901.

In accordance with the present invention, when it is desired to cast and place blank spaces, or space-types, in front of character-bearing types, or textual matter in a line of composed matter, one of the aforesaid repeat signals is made in the record-strip, before the type-signals are recorded and, when this special signal reaches the air bar, air passes to a valve which operates on a locking device for the record-strip feeding mechanism. During each successive cycle of the machine a cast is made in accordance with the now stationary and operative blank type-body signal in the record-strip. These repeated castings will continue until the assembled line of casts has reached the desired length, or full measure, when the leading type-body in the assembled line is caused to act upon, or operate, a second air valve to release the record-strip locking device.

In accordance with this invention also, when a number of blank-space types are to be placed after the character types in a line to finish or quad-out the line, another special repeat signal is made in the record-strip after the textual matter has been recorded. This signal, when presented at the air bar of the casting and composing machine effects the operation of a locking device for the record-strip, and brings into active operation a counting device. The counting device is set for a particular number of cycles of the machine and when the predetermined number of casts has been made in accordance with the now stationary and operative signal in the record-strip, the counting device will release the record-strip feeding mechanism.

These two devices may be used in the same line of composition, as for example, when one or more words are to be arranged in the centre of a full measure and blanks are required at both ends of the line to complete it, or they may be used separately, according to whether blank spaces are required only at the end or at the beginning of the composed line.

By alterations in the air-bar of the casting and composing machine and the provision of additional air-ports therein, with additional conduits to be led from such ports to the valves and air-piston controlling the operation of the aforesaid locking and lock-releasing devices, such conduits could lead direct to the air pistons controlling the locking and releasing devices, but, in accordance with the present invention, in order to avoid such structural alterations or additions to the normal machines, these locking and lock-releasing devices are operated through existing air ports by the introduction of a shift valve-mechanism, whereby the circuits or courses of signal-components are diverted from their normal stations, or from performing their usual functions, to other courses leading to the valves and air pistons for the aforesaid locking and lock-releasing devices.

The signals for operating the devices of the present invention will comprise components, which are not employed together as signals in the normal working of the casting machine. By this means straight-forward, or normal composition can be produced without detaching or disconnecting the mechanism of the present invention from the machine.

Referring to the accompanying drawings.

As above stated, the record-strip feeding mechanism, in which the mechanism of the present invention is embodied, is that described in the specification of said United States Letters Patent No. 674,362, to which reference may be had for a complete description of its construction and operation. It is deemed sufficient for present purposes to designate and identify the parts of such mechanism which are concerned, or co-operate with the mechanism of the present invention.

Figure 5:
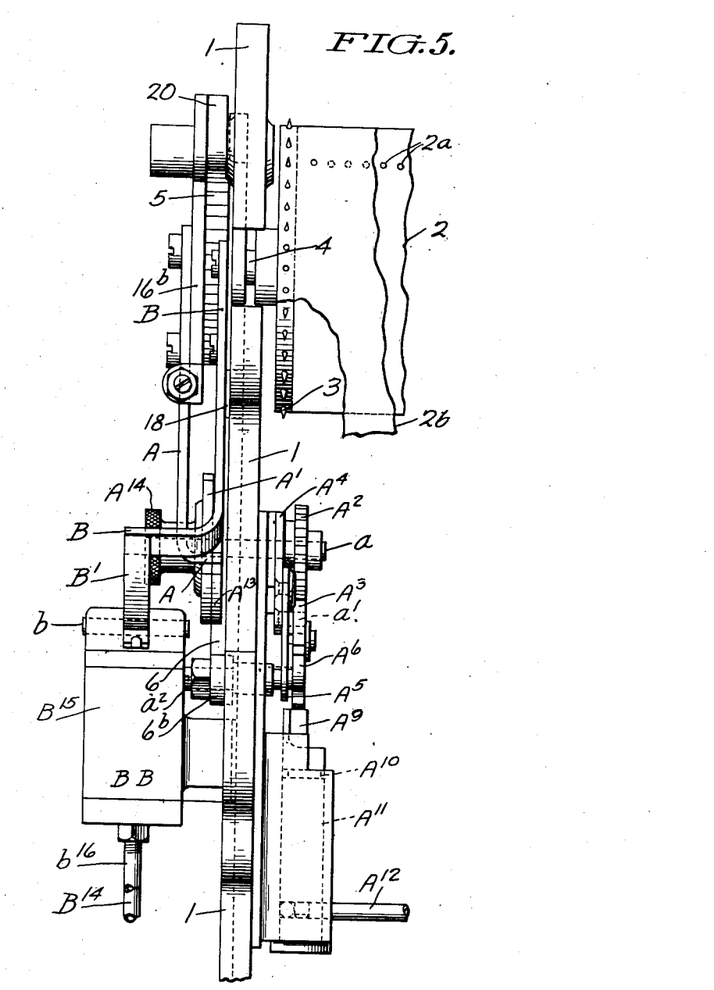
Fig. 5 is an end view of Fig. 4.

These parts, which are carried on a frame 1 attached to the frame of the casting and composing machine, comprise a stationary cross-bar 2, (Fig. 5) furnished with a series of air-ports 2ª leading to the various devices on the casting machine controlled by the perforations in the record-strip 2ᵇ; pin wheels 3 attached to a shaft 4 and rotated step by step to feed the record strip over the ports 2ª in the bar 2 by a ratchet wheel 5 secured to the shaft 4; a lever 6 pivoted to the frame 1 at 6ª and operated by a connecting rod 14, the outer end of which is mounted in a slotted link 8 on the end of a rod 9 which passes through a bearing 12 on the frame 1; a lever 11 pivoted at 7 and jointed at 10 to the upper end of the rod 9 operates an air-supply bar (not shown) which is lowered periodically to supply air to any ports 2ª, which are uncovered by the perforations in the record-strip; an adjustable stop 15 on the rod 9; a spring 13 which surrounds the rod 9; a holding pawl 16 for the ratchet-wheel 5 which is pivotally mounted in the frame 1 at 16ª; a driving pawl 17 pivotally mounted upon an annulus 18 which is mounted to turn concentrically with the ratchet-wheel 5 and is furnished with a lug 19 movable between adjustable stops 1ª on the frame 1; a lever 20 to the outer end of which the holding pawl 16 is pivoted, said link being pivotally coupled to a spring-box or elastic coupling 21, the lower end of which is attached to the driving lever 6; a link 22 pivotally attached at its upper end to the lever 20 and at its lower end to the actuating pawl 17; a spring 23 interposed between the holding pawl 16 and the actuating pawl 17; and a stop 24 for the actuating pawl.

As above stated the mechanism of the present invention comprises a locking device operated by a cast-repeat signal in the record-strip with a release device which acts to restore the recording strip feed after a predetermined number of repeat casts has been made and a second locking device for the record-strip feeding mechanism also controlled by a repeat-cast signal in the record-strip together with a release device operated by the cast and composed line when the latter has reached a predetermined length or measure.

According to the present embodiment of the invention, one of the locking devices comprises an arm A coupled with the holding pawl of the record-strip feed mechanism and the other a lever or arm B coupled with the feeding pawl of the same mechanism or with a part movable with the feeding pawl.

The arrangement or setting of the mechanism for casting a predetermined number of quads or blank spaces in the rear of character types or textual matter to finish or fill out a composed line, will first be described.

In this method of operating the machine, there is employed for arresting the record-strip feeding mechanism the aforesaid arm A, which is conveniently attached to the tail or an extension $16^b$ of the holding pawl 16. This lever A being attached to the holding pawl 16 rocks on the fulcrum $16^a$ of the pawl 16 each time the latter engages with or is disengaged from the ratchet-wheel 5 which advances the record-strip. In the path of oscillation of the lever A, there is mounted a rotatable stop and counting device, preferably in the form of a notched disc $A^1$. When the machine is being operated normally for the production of straight forward matter, the arm A swings to and fro with each operation of the holding pawl 16 so that the tail of the arm A at one end of its stroke enters freely into a notch in the disc $A^1$.

This disc $A^1$ is carried on an axle $a$ on the frame 1 and is arranged to be rotated stepwise by a ratchet-wheel $A^2$ also carried on the axle $a$ and actuated by a pawl $A^3$. This pawl $A^3$ is fulcrumed at $a^1$ on a frame or plate $A^4$ loosely carried on the axle $a$. The plate $A^4$ is connected by a link $A^5$ to an extension $6^b$ of the main operating lever 6 by a pin $a^2$ which passes through a slot in the main frame 1.

Figure 1:
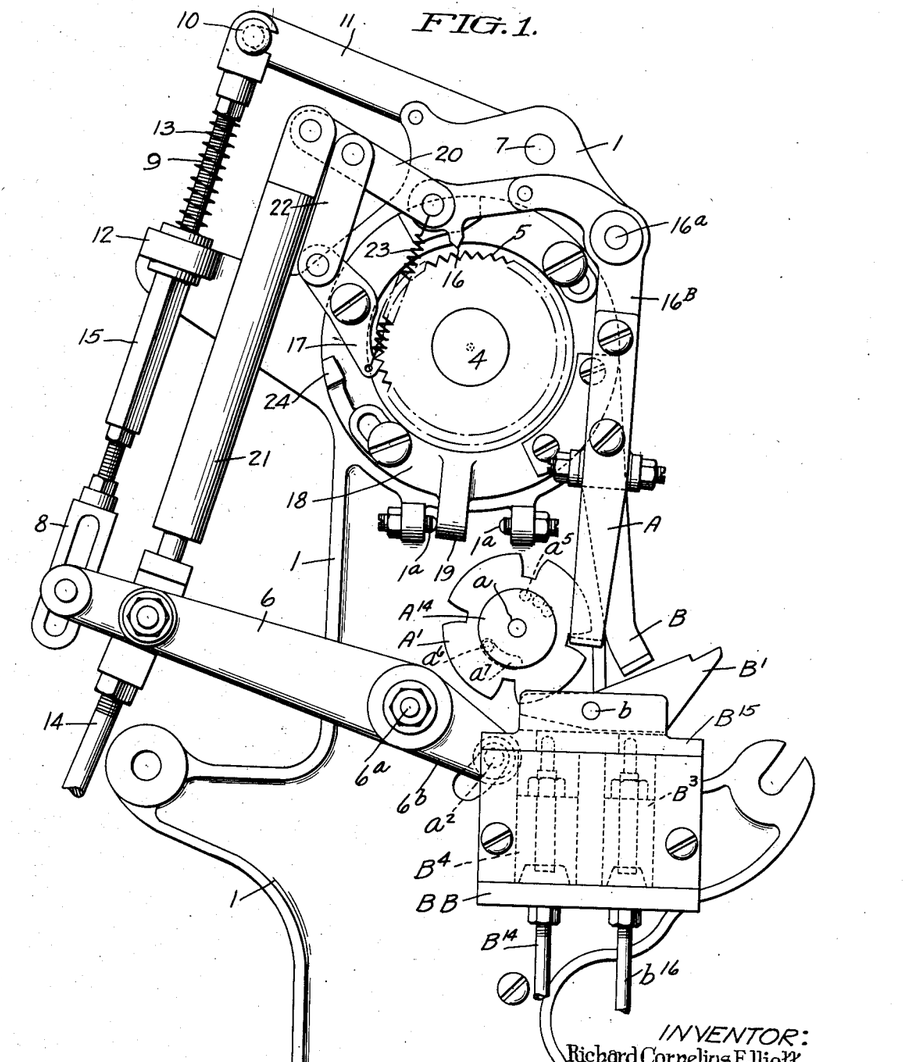
Fig. 1 is an outside side elevation of the record-strip feeding mechanism of an existing record-strip controlled type-casting and composing machine, in which is embodied mechanism according to the present invention. In this view the various parts are shown in position for normal working, the mechanism of the present invention being inoperative.
Figure 2:
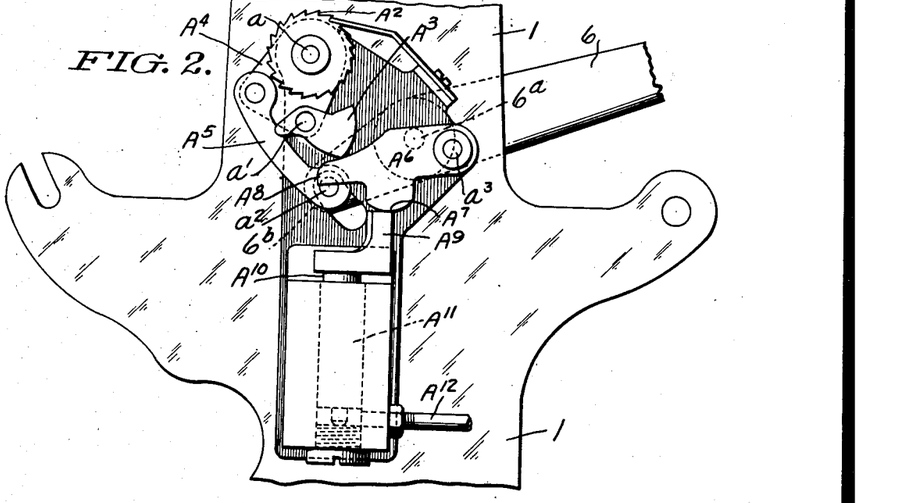
Fig. 2 is an inside side elevation of a portion of the mechanism shown in Fig. 1.
Figure 3:
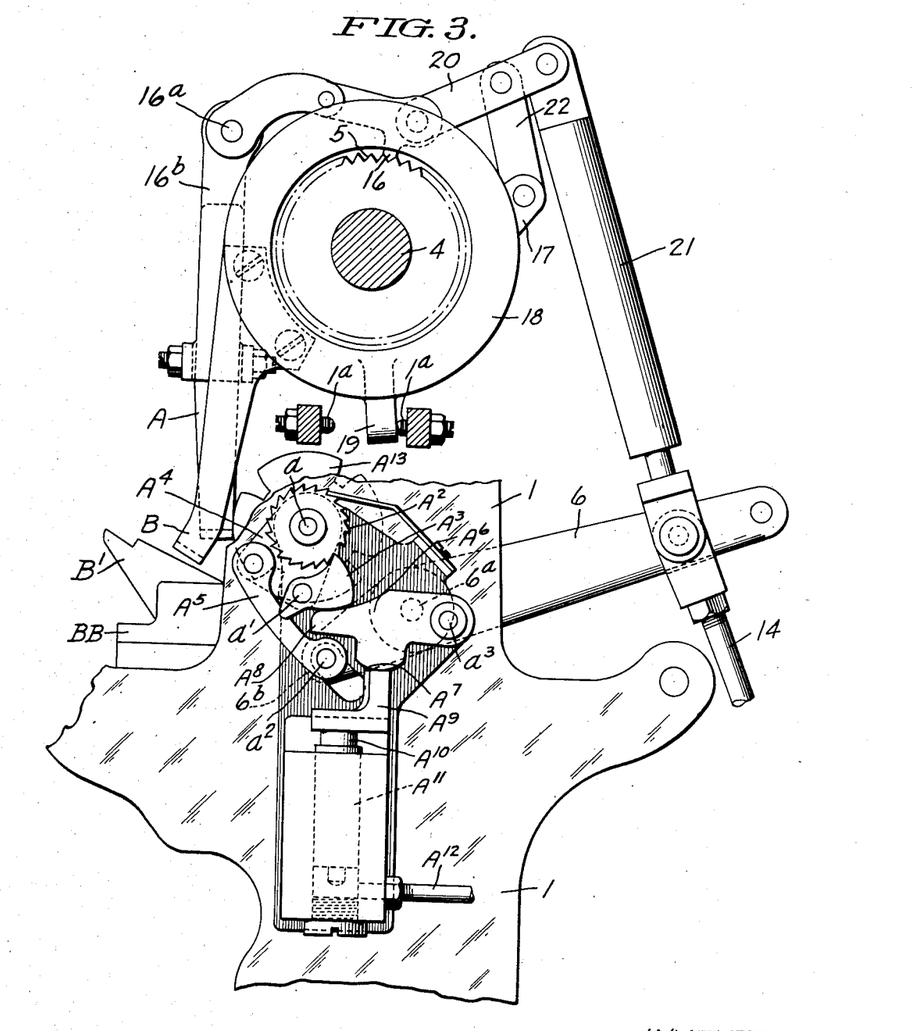
Fig. 3 is a side elevation similar to Fig. 1, but showing one of the mechanisms of the present invention in operative position to arrest the feed of the record-strip.

When the machine is operating normally to produce straight-forward composition, the pawl $A^3$, acting under gravity is out of engagement with the ratchet-wheel $A^2$ (see Fig. 2) so that the movements of the driving lever 6 do not produce any rotation of the ratchet-wheel $A^2$ and during such working stroke of the holding pawl the arm A as stated swings to and fro, and at one end of each stroke its lower end enters one of the notches in the disc $A^1$ (see Fig. 1). When, however, the repeat casting device is to be brought into action one of the special signals will be presented by the record-strip. This casting repeat-signal to quad or finish the line causes the pawl $A^3$ to be moved into engagement with the ratchet-wheel $A^2$. This movement is accomplished in the present embodiment by a latch or lever $A^6$ fulcrumed at $a^3$ on the frame 1. On the underside of the lever $A^6$ is a curved boss $A^7$ which rests against a head $A^9$ attached to the piston $A^{10}$ of an air cylinder $A^{11}$. The special signal in the record-strip causes air to be admitted to the lower end of the cylinder $A^{11}$, the lever $A^6$ is raised by the upward movement of the head $A^9$ from the idle position (Fig. 2) to the operative position (Fig. 3). By this movement the forward end $A^8$ of the lever $A^6$ raises the pawl $A^3$ into engagement with the ratchet-wheel $A^2$ and acts as a guide and support for that pawl, so that as long as the head $A^9$ is raised the pawl $A^3$ advances the ratchet-wheel $A^2$ one step for each driving stroke of the lever 6. The rotation of the ratchet-wheel $A^2$ causes a similar rotation of the notched disc $A^1$ which, in rotating, brings a solid portion of its edge into the path of the lever A (see Fig. 3) thus preventing the holding pawl 16 from being disengaged from the feed ratchet wheel 5, and thereby the feed of the record-strip is arrested. The spring-box coupling 21 on the existing actuating mechanism of the record-strip feed allows the other related parts of the feed mechanism to act normally.

While the disc $A^1$ is being rotated step by step, a cast is made during each cycle of the machine as dictated by the now operative type-signal in the stationary record strip. This procedure continues until the next notch in the disc $A^1$ comes into line with the lever A, which moves into the notch, thus presented, to release the holding pawl 16 and allow the feed of the record-strip to be resumed.

It is desirable that the numbers of successive or repeated casts arising from a single signal in the record-strip may be varied and with this in view the notched disc is made variable or adjustable.

Conveniently this is accomplished by the employment of a supplementary notched disc $A^{13}$ arranged behind and concentric with the disc $A^1$, so that by turning or moving these two discs relatively to each other the length or extent of the solid rims thereof, which act as a stop for the lever A, may be varied.

In Fig. 1 the disc is shown as having four notches and four equal undivided or solid portions on its periphery. This arrangement is so contrived that five casts will be made while the disc is being rotated stepwise through a distance between two notches.

Figures 6, 7, 9, 10, 11, 12:
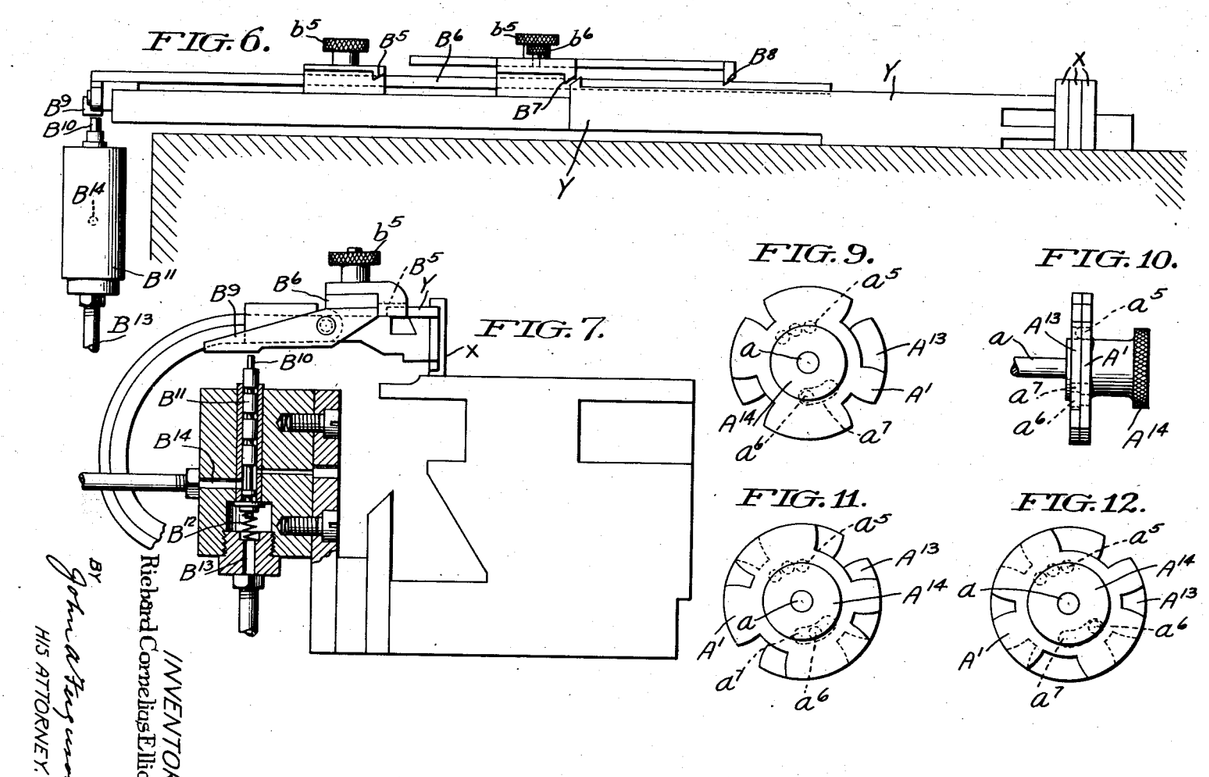
Fig. 6 is a front elevation of a portion of the type-line assembly and galley mechanism of the aforesaid type casting and composing machine showing mechanism embodying the present invention, which is controlled by an assembled line of type bodies.
Fig. 7 is an end view of Fig. 6.
Figs. 9, 10, 11 and 12 are detail views of the adjustable counting device.

In Fig. 9 is shown a rear view of the disc $A^1$ and of the disc $A^{13}$. The solid portions of the rim of the disc $A^{13}$ are not of equal length but in the setting shown in Figs. 1 and 9 the notches in the two discs coincide.

By relatively moving the discs $A^1$ and $A^{13}$ into the position indicated in Fig. 11 only two notches are operative and two portions of solid periphery are provided. Each of these portions is of a length that ten repeated casts are made while the discs are rotated the distance between two notches.

By a further relative adjustment of these two discs as shown in Fig. 12 there is only one notch operative and the remainder of the periphery is solid, so that twenty casts can be made during a complete rotation of the discs revolving together as one.

The disc $A^1$ is conveniently furnished with a knob $A^{14}$ by which it can be adjusted relatively to the disc $A^{13}$ and spring-ball or other detents $a^5$ are conveniently provided between the two discs to hold them against accidental movement. A pin $a^6$ is mounted on the rear side of the disc $A^1$ and arranged to move in a slot $a^7$ in the disc $A^{13}$ to limit the relative movement of the discs.

With any of the above described settings, a predetermined number of casts is made and governed solely by the presentation of the signal which locks the paper-feed.

When it is desired to place a number of blank space-types in a line in front of character type or textual matter, the second locking device B, already referred to, is employed.

This locking device, like the other, is brought into action by a special signal in the record-strip, but the release of the locking device to restore or restart the record-strip feed, is not operated after a predetermined number of casts has been made, but when the requisite number of type bodies has been cast.

As already stated, the line is cast backwards, so that blank spaces which are actually in front of the character types or textual matter in a line are the last to be cast.

When the machine is to be operated for such composition, a second special signal is made in the record-strip. This signal effects the arrestment of the record-strip feed mechanism by acting on the lever B which is conveniently attached to the annulus 18 carrying the record-strip driving pawl 17.

Figure 4:
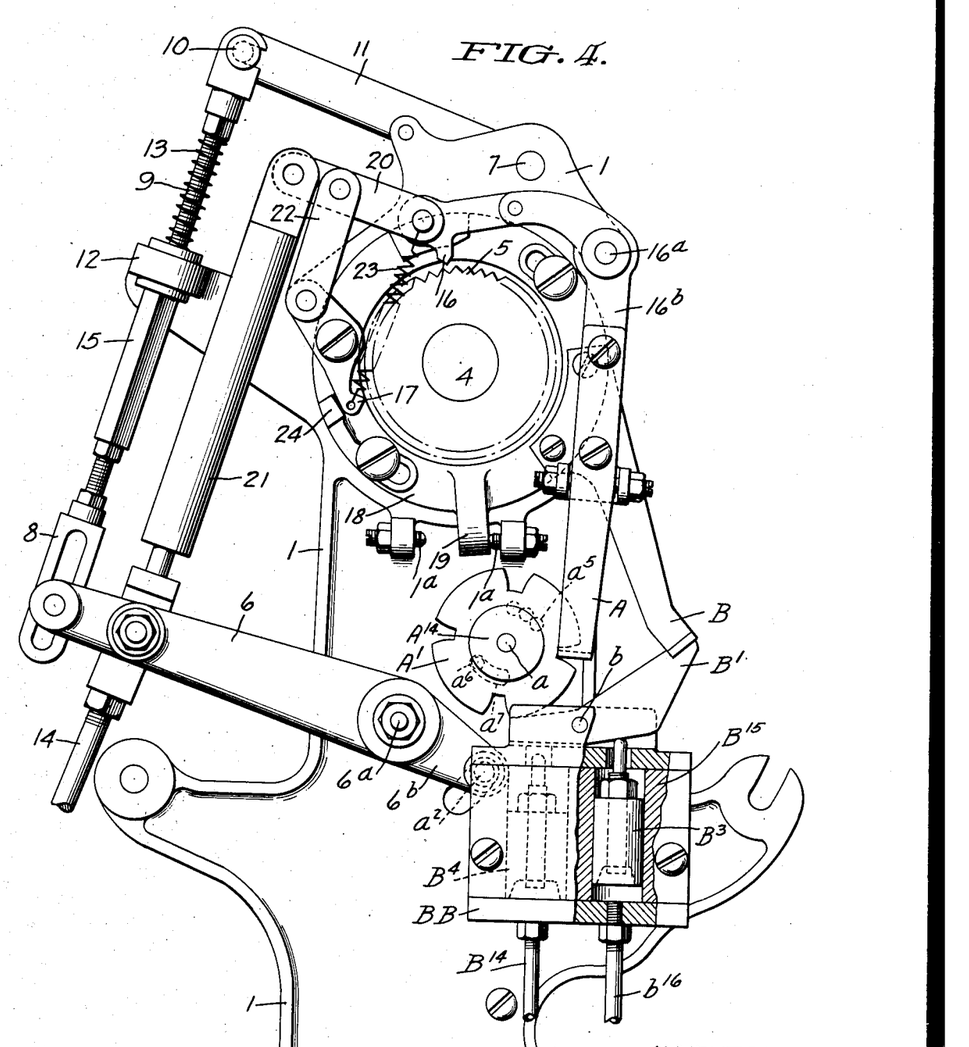
Fig. 4 is an elevation similar to Fig. 1, but showing another of the mechanisms of the present invention in operative position to lock or arrest the record-strip feeding mechanism.

During normal composition, this lever B oscillates freely each time the annulus 18 is operated. When, however, the special signal is presented, a latch or catch $B^1$ pivoted at $b$ to a valve box BB, is raised from the position shown in Fig. 1 to that shown in Fig. 4. When so raised, the latch $B^1$ is moved into the path of the lever B and prevents it from travelling, and, therefore, arrests the movement of the annulus 18. The driving pawl 17, therefore, cannot operate the record-strip feed ratchet wheel 5, but the spring box 21 allows the other mechanisms to continue to act normally.

The latch $B^1$ is moved into position to lock the lever B by the movement of a piston in an air cylinder $B^3$. Air is supplied to raise the piston of the air cylinder $B^3$ by the special signal in the record-strip. As long as the lever B is locked against movement, repeated casts will be made in accordance with the now operative and stationary type-signal in the record-strip until the cast line of types has reached full measure, or a predetermined length.

When this stage has been reached then the leading type-body X in the line of types cast, pushes a line-support Y which is mounted to slide in the type line channel of the machine, against a stop $B^5$ (see Fig. 6) which is mounted on a rocking-bar or frame $B^6$, which in turn is mounted on a part of the galley mechanism known as the column pusher.

The leading end of the line-support Y is bevelled (see Fig. 6) to engage a correspondingly shaped part on the underside of the stop $B^5$.

When this engagement takes place, a valve $B^{10}$ $B^{11}$ is operated to admit air to a chamber and raise a piston $B^4$ which acts on the latch $B^1$ to release the arm B and restore the normal feed of the record-strip.

The stop $B^5$ is intended for use with lines of composition of normal length, but repeat castings from a single record-strip signal, can be produced in various sections of, or at varying points in, a line of composition, by providing additional stops.

In the embodiment illustrated, the stop $B^5$ may be adjusted along the rocking frame $B^6$ and be fixed by a screw $b^5$. One additional and similar stop $B^7$ is also mounted on the frame $B^6$ and a third stop $B^8$ is conveniently adjustably carried on the stop $B^7$ and can be fixed thereto by a screw $b^6$.

Behind the bevelled nose on the line support Y, the body thereof is cut away so that the frame $B^6$ can return to normal position after the stops $B^7$ and $B^8$ have been passed.

On one end of the rocking-bar $B^6$ there is mounted a lever $B^9$ (see Figs. 6 and 7) which,
when the bar $B^6$ is rocked by the contact of the line support Y with one or other of the stops $B^5$, $B^7$ or $B^8$, is pushed against the piston $B^{10}$ of a valve $B^{11}$. This valve $B^{11}$ is normally closed by a spring $B^{12}$ and a supply of constant air is led into the valve chamber below the valve through an opening $B^{13}$. When the valve stem or piston is depressed, air entering through the opening $B^{13}$, passes through the valve and out by an opening $B^{14}$, thence by a conduit to the lower end of the cylinder in which the piston $B^4$ is situated. The air causes the piston $B^4$ to rise and act on the tail of the latch $B^1$ and release the lever B.

The pistons $B^3$ and $B^4$ are arranged in cylinders in a box or housing $B^{15}$. The piston $B^4$ and the cylinder in which it operates are of greater diameter than the piston $B^3$ and its cylinder, so when air enters the cylinder of the piston $B^4$ it overcomes any air pressure acting on the piston $B^3$ and ensures the proper retraction of the latch $B^1$.

Figure 8:
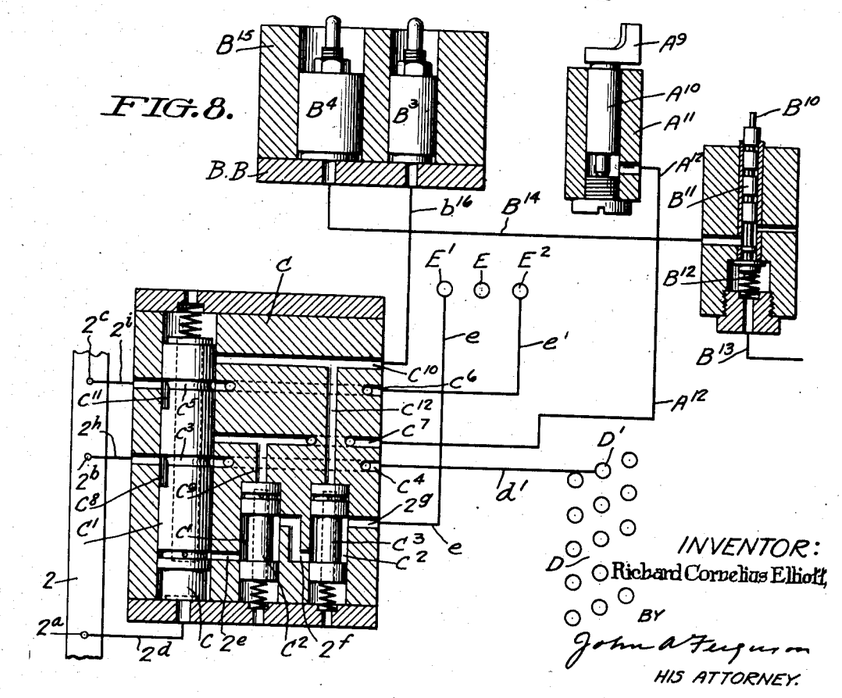
Fig. 8 is a diagrammatic view showing the valve and air-piston devices employed in one embodiment of the present invention.

The arrangement of valves and pistons and the means adopted whereby these can be operated by employing signals, the components of which are not employed to form a signal in the normal running of the machine, is indicated diagrammatically in Fig. 8.

According to this arrangement there is introduced into the existing air conduits leading from the air bar 2 to their ordinary stations D or E on the normal machine, a valve box C the valves in which are operated by one or other of the special signals or the components thereof, as above referred to, to divert the air streams in certain conduits from their normal station and cause such air to operate on the air pistons $A^{10}$ and $B^3$ already referred to, and the valves in the valve box C.

In Fig. 8 only the components of signals which are used together or in combination to operate the mechanisms of the present invention are shown, viz., $2^a$, $2^b$, and $2^c$ in the air bar 2, it being understood that these components form parts of other signals in the normal operation of the casting machine. The group of air pins D exists on the normal machine, and each pin of the group may be blown up or operated to determine the position of the die case. Each pin in the group E may be used in the normal machine for a specific object.

This group D of die-case positioning pins is duplicated on another part of the machine to determine positions of the die case in a direction at right-angles to that determined by the pins of the group D.

When the valve mechanism C is introduced in accordance with the present invention and the machine is to run for normal composition, then when a perforation in the record-strip exposes or uncovers the port $2^a$ in the air bar 2, the air admitted will pass by a conduit $2^d$ through an opening in the valve casing C to the lower end of a chamber in which is situated a valve $C^1$. The air pressure will raise the valve against the action of a controlling spring, and pass around a reduced lower end $c$ of this valve, thence by a passage $2^e$ into a chamber in the casing in which is situated a valve $C^2$, around a reduced portion $c^1$ of which the air will pass by a conduit $2^f$ into a chamber wherein is situated a valve $C^3$. The air then passes around a reduced portion $c^2$ of this valve, thence by an opening $2^g$ to a conduit $e$ leading to its normal station $E^1$ of the group E.

Similarly, in normal working, air admitted through the port $2^b$ in the air bar 2, when forming a component of a normal signal is led by a conduit $2^h$ into the chamber of the valve $C^1$. Such air then passes by an annular groove $c^3$ in the valve $C^1$ to a passage $c^4$ in the housing of the valve, and thence by a conduit $d^1$ to an air pin $D^1$ in the group D.

In like manner when air passes by the port $2^c$ in the air bar 2 as a component of a normal signal it is led by a conduit $2^i$ into the chamber of the valve $C^1$, and passes around an annular groove $c^5$ in this valve to a passage $c^6$ in the housing of the valve, and thence by a conduit $e^1$ to an air pin $E^2$ in the group of pins E.

For the purpose of this invention the signal for operating the repeating device controlled by the air piston $A^{10}$ comprises components $2^a$ and $2^b$, while the signal for controlling the repeating device controlled by the air piston $B^3$ comprises the components $2^a$ and $2^c$.

When the repeat device controlled by the air piston $A^{10}$ is to be operated, air is admitted to the valve box C by the ports $2^a$ and $2^b$. Air passing from the port $2^a$ raises the valve $C^1$, thereby cutting off communication between the conduits $2^h$ and $c^4$ and brings the annular groove $c^3$ in the valve $C^1$ opposite a passage $c^7$ in the housing C. Extending downwards from the annular channel $c^3$ is a groove $c^8$ so that air now passes from the conduit $2^h$ by the grooves $c^8$ and $c^3$ to the passage $c^7$ by which the air is conveyed by the conduit $A^{12}$ to the air piston $A^{10}$. At the same time some of this air passes from the channel $c^7$ into a vertical channel $c^9$ and forces down a valve $C^2$, which cuts off the air from the port $2^a$ from reaching its normal destination.

When the repeat casting device controlled by the air piston $B^3$ is to be in action the components of the signal admit air to the valve box C through the air ports $2^a$ and $2^c$. The air from the port $2^a$ again raises the valve $C^1$ thereby cutting off communication between the conduits $2^i$ and $c^6$ and bringing the annular groove in the valve into line with the passage $c^{10}$. Communicating with the annular groove $c^5$ in the valve is a vertical groove $c^{11}$ so that when the valve is raised the air passes from the port $2^c$ by the conduit $2^i$ grooves $c^{11}$ and $c^5$ to the passage $c^{10}$ and thence by a conduit $b^{16}$ to the air piston $B^3$. At the same time part of the air in the conduit $c^{10}$ is led by a passage $c^{12}$ and pushes the valve $C^3$ down, which in turn cuts off the air from the port $2^a$ from reaching its normal station. The valves $C^2$ and $C^3$ in place of being arranged in separate chambers as illustrated in Fig. 8 may be arranged in tandem in a single chamber. In this case the necessary air will be led into the chamber so that one of the valves can be operated as required without interfering with the other or when air is admitted through another conduit both valves will be actuated as one.

Components of normal signals, other than those above indicated, may be employed to form components of signals for operating the aforesaid locking and releasing devices, so long as the combination employed is not one used for the normal operation of the composing machine and therefore will not interfere with such normal operations. Such components may come in part from the groups E or D or from the group complementary to the group D.

The signals above-mentioned for actuating or setting in operation the locking and releasing devices controlling repeated casts, also dictate or determine a position of the die case or matrix-carrier which places the blank matrix for a quad or space over the mold. By such arrangements it is not necessary for the operator of the record-strip composing machine to perform a separate act to position the die case. The said signals therefore are combined signals serving the purposes of actuating the repeat-casting devices and positioning the die case.

In "standard" lay-outs the quad or space matrix occupies a constant position in the die case, but there exist certain modified lay-outs where the quad or space matrix may be in one or other of a limited number of constant positions. In these cases the signals, controlling the actuation of the repeat-casting devices, must consist of different components and, in order to render the mechanism above described responsive to such modified signals and bring the proper matrix over the mold, a switch valve may be introduced between conduits leading from the paper-tower of the casting machine and the valve box C. Such a valve may be set in any one of several positions so as to divert currents of air from their normal destinations and through the valve mechanism to the record-strip feed devices and at the same time dictate the proper position of the die-case.

The latch $B^1$ in place of acting on a lever such as B connected to the annulus carrying the driving pawl, may be arranged to act directly or indirectly between the arm 19 on the annulus and one of the limiting stops $1^a$ therefor.

In the existing record-strip composing machines when it is desired to compose a record-strip for a line of type-bodies and the text, word, or words, is or are in the centre of the line with blank spaces in front, and in rear, the compositor or operator must proceed as follows: He must calculate the number of ems to be occupied by the text, deduct this from the total ems in the line: operate and record separate signals for spaces equal to one half of the line remainder, to place such spaces in front of the text, and then record signals for the other half of the line remainder to place spaces in rear of the text.

By use of the present invention the operation is simplified and the amount of record-strip required is materially reduced.

In accordance with this method the operator treates the spaces to be placed in front of the text as an undetermined quantity, and merely records the signal for bringing into operation the locking device for the record-strip, the release of which is controlled by the length of the cast line. He then records the signals for the text, then from an existing line scale reads the number of ems unoccupied, then gives the signal for the record-strip locking device, the release of which is controlled by the counting devices, after a predetermined number of repeat casts has been made.

When only one repeat device is required for the nature of composition to be produced, then the procedure outlined above applies to the particular device required.

In the new method of operation of the composing machine to produce the required record-strip the signals for the justification of a line remains unaltered.

I claim:

1. In a record-strip controlled single-type casting and composing machine the combination with a record-strip feeding mechanism comprising a ratchet wheel, and a driving pawl and a holding pawl therefor, of a locking lever coupled to or operative on the holding pawl, a locking device and an adjustable counting device for the lever, operated from a signal in the record-strip, to effect a predetermined number of casts from a single-type in the record-strip and then release the feeding mechanism, and a second locking device arranged to arrest the driving pawl by a signal in the record-strip and to release the said pawl when a number of repeated casts from a single-type signal in the record-strip has been made to bring the line of types to the desired length or limit.

2. In a record-strip controlled single-type casting and composing machine the combination with a record-strip feeding mechanism comprising a ratchet wheel, a driving pawl and a holding pawl therefore, of a locking lever adapted to act on the driving pawl, an air piston operated from a signal in the record-strip to arrest the locking lever and the driving pawl while repeated casts are being made from a single type-signal in the record-strip, and a second air piston operated to release the locking lever and pawl by a composed line of types, including such repeated casts, when such line has reached a predetermined limit.

3. In a record-strip controlled type-casting and composing machine, the combination with a record-strip feeding mechanism comprising a ratchet wheel, a driving and a holding pawl therefor, the combination with a locking lever coupled with the holding pawl, of a stop and counting device for the lever and pawl, and an air piston operated by a signal in the record-strip, to inaugurate the movement of the stop and counting device, which latter is adapted to restore the record-strip feed when the predetermined number of casts has been made in accordance with a single type signal in the record strip.

4. In a record-strip controlled type-casting and composing machine, the combination with a record-strip feeding mechanism comprising a ratchet wheel, a driving pawl and a holding pawl therefor, of a locking lever movable in company with the driving pawl and a latch operated by an air piston under the control of a signal in the record-strip to arrest the lever and pawl while repeated casts are being made from a single type-signal in the record-strip, and operated subsequently by an air piston under control of a valve actuated to release the said lever when the assembled line of types has reached a predetermined limit or length.

5. In a record-strip controlled single-type casting and composing machine, furnished with a record-strip feeding mechanism comprising a ratchet wheel, driving-pawl and a holding pawl therefor, the combination with a locking lever arranged to move in company with the holding pawl of an adjustable stop and counting device for the locking lever, a ratchet wheel for rotating the counting device, a driving pawl for the ratchet wheel carried upon a constantly operating mechanism, and an interponent operated by an air piston under control of a signal in the record-strip to render the interponent operative or inoperative.

6. In a record-strip controlled single type-casting and composing machine furnished with a record-strip feeding mechanism comprising a ratchet wheel or holding pawl and a driving pawl therefor, an arrangement in a record-strip control mechanism according to claim 5 of a combined stop and counting device acting upon the said holding pawl, comprising two concentrically mounted and relatively movable discs having notched or interrupted surfaces for varying the number of casts to be made from a single signal in the record-strip.

7. In a record-strip controlled type-casting and composing machine, furnished with a record-strip feeding mechanism comprising a ratchet wheel a driving and a holding pawl therefor, the combination with a locking lever for the driving pawl and a latch arranged to act on the said lever of an air piston operated by a record-strip signal to engage the said lever, an air piston also operative on the latch and furnished with a valve arranged at one end of the line assembly channel, a rocking bar furnished with one or more stops and adapted to be rocked to operate said valve by a movable line supporting member.

8. In a record-strip controlled single-type casting and composing machine furnished with a record-strip feeding mechanism comprising a ratchet wheel and a holding pawl and a driving pawl therfor, the combination with one or more locking devices operated from a signal or signals in the record-strip and one or more releasing devices operated either after a predetermined number of repeat casts has been made or when a cast and composed line of type, including repeat casts has reached a predetermined length or measure of a valve mechanism arranged in conduits leading from a record-strip controlled airport bar to normal stations on the machine, and comprising a main and one or more supplementary valves and a combination of conduits whereby the main valve and one of the supplementary valves is operated to divert air from the normal stations to a locking device for the record-strip feeding mechanism.

9. In a record strip controlled single type casting and composing machine, the combination with a record strip feeding mechanism, means controlled by a special signal in the record strip for locking said mechanism for a predetermined number of machine cycles or revolutions, means for unlocking said locking means after the predetermined number of cycles have been performed, thus allowing both the strip feeding mechanism and the other machine operations to proceed in a normal manner, a second locking means for the record strip feeding mechanism and a second unlocking means for said second locking means, said second unlocking means being manually positioned to be operated by the line of types produced by the machine under the control of the signals in the record strip.

RICHARD CORNELIUS ELLIOTT.